Dec. 7, 1965   L. L. CHAMBERLAIN   3,221,913
HANDLING APPARATUS

Filed July 8, 1964   2 Sheets-Sheet 1

INVENTOR.
LOUIE L. CHAMBERLAIN

Dec. 7, 1965                L. L. CHAMBERLAIN                3,221,913
                              HANDLING APPARATUS
Filed July 8, 1964                                        2 Sheets-Sheet 2
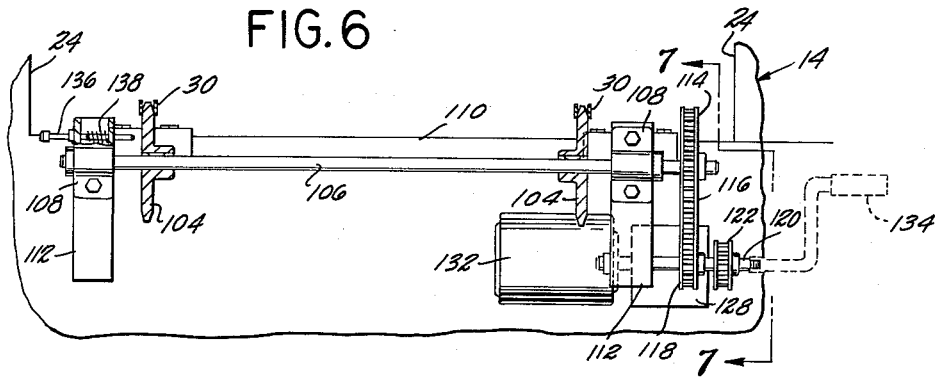
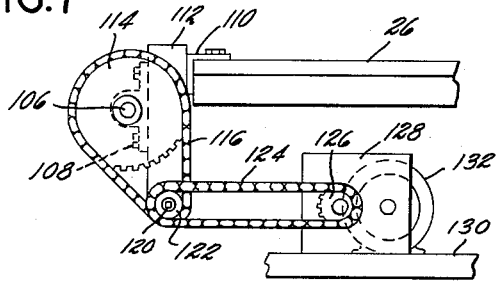
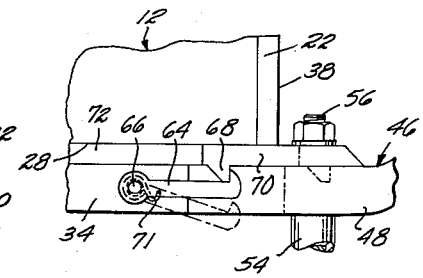
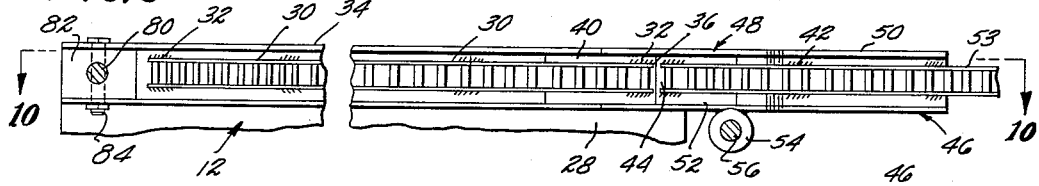
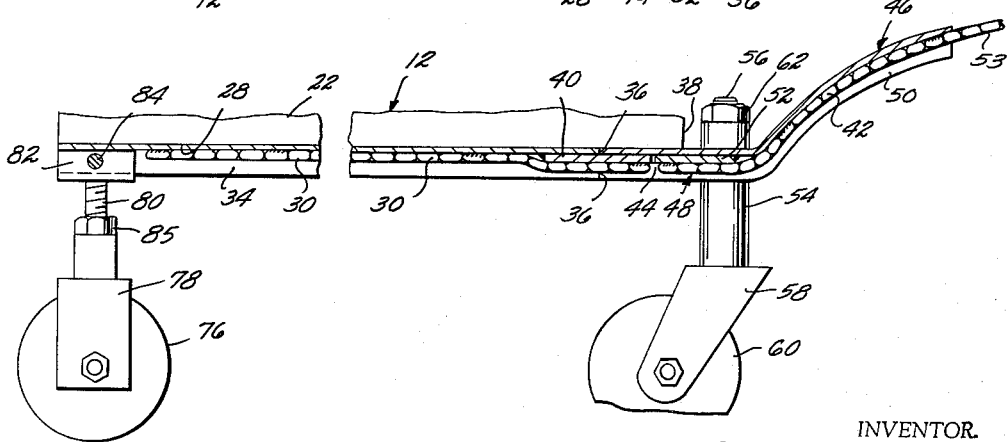
INVENTOR.
LOUIE L. CHAMBERLAIN United States Patent Office 3,221,913
Patented Dec. 7, 1965

3,221,913
HANDLING APPARATUS
Louie L. Chamberlain, 5243 Brookdale Road,
South Gate, Calif.
Filed July 8, 1964, Ser. No. 380,994
8 Claims. (Cl. 214—517)

The present invention relates to handling apparatus for transferring a bulky item between a supporting surface and an elongated platform or the like, and more particularly to handling apparatus for mounting and demounting a camper body relative to a vehicle such as a pick-up truck.

The detachable camper-truck combination is becoming increasingly familiar on our highways because of the many advantages which this type of composite vehicle provides for camping enthusiasts. The demountable camper is generally less expensive than the conventional wheeled trailer which is towed behind an automobile, and its demountable character permits it to be unloaded from the pick-up truck to free the truck for other purposes when needed.

A camper ordinarily weighs between 900 and 1200 pounds, and present practice is to unload the camper from the truck by positioning several hydraulic jacks upon the ground or other supporting surface and operating the jacks to lift the camper off the truck bed. The truck is then driven from under the trailer. The loading operation is just the reverse of the unloading operation, although it requires extremely careful backing of the vehicle. Since the unloaded camper is supported upon the jacks, it cannot be moved about and poses something of a hazard because of its relatively high center of gravity.

Accordingly, it is an object of the present invention to provide apparatus for mounting and demounting a camper body relative to a vehicle such as a pick-up truck without the use of jacks and without any necessity for backing the vehicle beneath the camper body during an unloading operation. A related object of the invention is to provide such an apparatus capable of operation by one man and which positions the camper body directly upon the ground. With this arrangement the body may be provided with wheels so that it is sufficiently mobile to permit its position to be changed without using a truck or the like. Its low center of gravity provides a desirable safety factor, and the problem of providing proper storage for jacks or the like is completely eliminated.

Another object of the present invention is to provide apparatus of the aforementioned character which can be relatively easily made a part of existing camper body-truck combinations at comparatively low cost.

Although the present apparatus has particular applicability to camper-truck combinations, it will become apparent that the apparatus also has general utility with respect to the transfer of any bulky item between a supporting surface and an elevated platform such as the bed of a vehicle.

Other objects and features of the invention will become apparent from consideration of the following description taken in connection with the accompanying drawings, in which:

FIG. 6 is an end elevational view of the truck rear end, illustrating the drive means mounted thereon, portions thereof being sectioned for clarity;

FIG. 7 is a view taken along the line 7—7 of FIG. 6;

FIG. 8 is an enlarged detail view taken along the line 8—8 of FIG. 1;

FIG. 9 is an enlarged view taken along the line 9—9 of FIG. 1; and

FIG. 10 is a view taken along the line 10—10 of FIG. 9.

Figure 1:
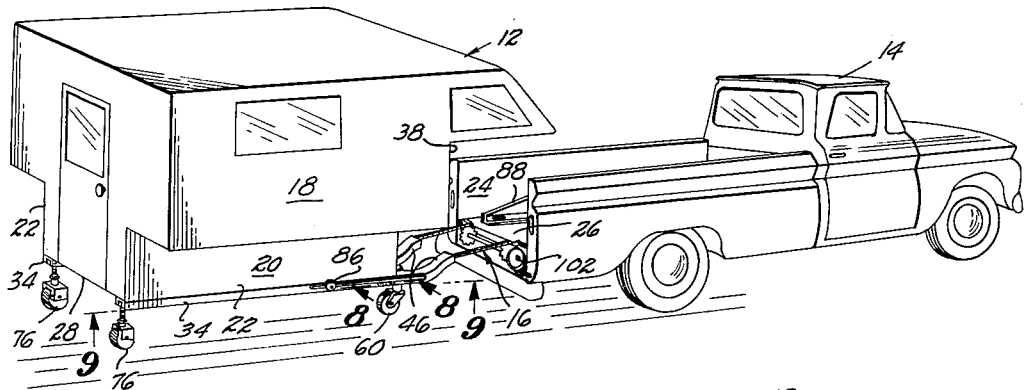
FIG. 1 is a perspective view of a composite vehicle comprising a camper and a pick-up truck, the camper being illustrated in position for loading upon the truck bed.

Referring now to the drawings, there is illustrated a demountable camper 12, a pick-up truck 14, and the novel handling apparatus of the present invention, generally designated by the numeral 16, which is adapted to transfer the camper between the ground and the truck bed.

The camper 12 may take any of a variety of forms, depending upon the particular manufacturer, and conventionally includes an upper portion 18 which is relatively wide and long, projecting over the cab of the truck as illustrated, to provide maximum space for sleeping accommodations. The lower portion 20 of the camper is made narrower in order that the side walls 22 thereof can fit between the confronting side walls 24 of the truck bed 26. In addition, the camper lower portion is made high enough so that the overhanging sides of the upper portion 18 do not bear heavily against the upper edges of the truck side walls 24 when the base 28 of the camper is resting upon the truck bed 26.

Although the present invention will be described in connection with the mounting and demounting of such a camper relative to a pick-up truck, it will be apparent that the handling apparatus 16 has broader and more general utility. As will be seen, the apparatus 16 provides a means whereby almost any bulky item can be brought into position adjacent an edge of an elevated platform, tilted, urged onto the platform, and again tilted for properly orienting the item in position. Accordingly, the description of a camper-truck application is merely exemplary and not to be construed in limitation of the scope of the present invention.

The apparatus 16 comprises complemental portions which are adapted to be mounted to the camper 12 and to the truck 14, respectively, the portions being cooperative to move the camper in a longitudinal direction relative to the truck.

Figure 3:
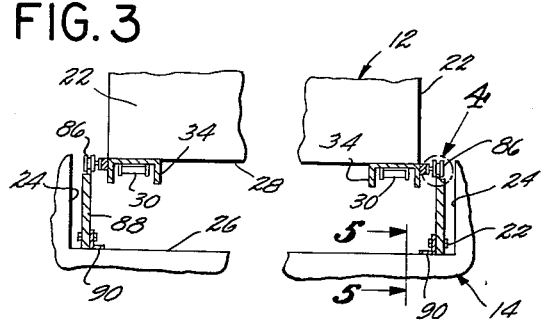
FIG. 3 is an enlarged view taken along the line 3—3 of FIG. 2.

More particularly, the portion of the apparatus 16 which is associated with the camper 12 comprises, generally, a pair of elongated, longitudinally oriented chains 30 each of which is welded at a number of weld points 32 along its length to one of a pair of elongated transversely spaced-apart U-shape channels 34. The base of each channel 34 is rigidly secured in any suitable fashion to the underside or base 28 of the camper 12, as best illustrated in FIGS. 3 and 9.

As seen in FIGS. 9 and 10, the forward end 36 of each channel 34 terminates just rearwardly of the forward wall 38 of the camper, and a short plate 40 is fitted between the legs of each channel and welded to the channel base. The forward extremity of each plate 40 projects forwardly of its channel and the forward extremity of the associated chain 30 passes beneath the plate 40 and is welded to it.

A continuation of the chains 30 are provided by a pair of chain extensions 42, with only a small gap therebetween, as illustrated at 44 in FIG. 10. Each chain extension 42 constitutes a part of an extension arm or ramp 46 which is demountably attached to the forward end of the camper 12. As best illustrated in FIGS. 1, 9 and 10, each ramp 46 also includes a longitudinally oriented, U-shape ramp channel 48 having a rearwardly extending straight portion which abuts against the end 36 of an adjacent channel 34, and an upwardly curved forward or ramp portion 50. A short plate 52 is fitted between the legs of the channel 48 and is welded to the base thereof forwardly of the rearward end of the channel 48 in abutting relation with the forwardly projecting end of the plate 40 when the ramp 46 is in mounted position. The chain extensions 42 are welded at spaced points along their lengths to the channels 48 and extend beyond the forward ends of the channels 48 in the form of flexible chain sections 53.

The ramps 46 provide mobile support for the forward end of the camper 12 and for this purpose each includes an elongated, vertically oriented, and internally threaded sleeve 54 welded to the inward leg of the channel 48, as best viewed in FIGS. 9 and 10. The sleeve 54 rotatably receives a vertical threaded shaft 56 secured at its lower end to a wheel bracket 58 which rotatably mounts a wheel 60 for swivel movement. A nut 62 is provided to secure the shaft 56 in position within the sleeve 54 after adjustment of the shaft 56 to vary the height of the camper relative to the ground.

After the ramps 46 are slid into mounted position upon the camper they are each locked in position by one of a pair of elongated hooks 64, as best viewed in FIG. 8. Each hook 64 is pivoted at its rearward end to a pin 66 which is secured to and projects laterally of the outer leg of the adjacent ramp channel 48. The forward end of the hook 64 is adapted to engage a projection 68 welded to and depending from an elongated ramp bar 70 which is welded to the upper side of the ramp channel 48, the hook being biased toward such engagement by a torsion spring 71 mounted upon the pin 66 and engaged between the hook and the adjacent channel 34. Each bar 70 constitutes a forward extension of a similar elongated bar 72 which is welded in similar fashion to the channel 34, the two bars 70 and 72 abutting when the associated ramp 46 is in mounted position.

With this arrangement, the ramps 46 may be quickly mounted to the forward end of the camper 12 by merely sliding the channel extensions 48 into abutting relationship with the channels 34 so that the upwardly biased hooks 64 slide over and then engage the projections 68 to secure the ramps 46 in position, the wheels 60 of the ramps providing swiveling support for the camper 12 at its forward corners.

Support for the camper 12 at its rearward corners is provided by a pair of wheels 76 which are each rotatably carried by a bracket 78 which threadably mounts a vertical, threaded shaft 80 welded at its upper end to a mounting pad 82 which is longitudinally slidable within the channel 34. Each pad 82 is demountably secured in position by means of a nut and bolt assembly 84, the bolt of which is transversely oriented through the legs of the channel 34 and through the pad 82 to secure the pad and its associated wheel mount against longitudinal movement. A nut 85 is provided for fixing the vertical position of each wheel 76 after the bracket 78 thereof has been rotated to adjust the height of the camper as desired. The above arrangement provides a means for quickly demounting the wheels 76 when desired.

The previously mentioned bars 72 secured to the camper channels 34 each rotatably mount one of a pair of cam wheels 86 which cooperate with a pair of transversely spaced-apart, vertically oriented cam plates 88 secured to the truck bed 26 by a pair of brackets 90, as best viewed in FIG. 3. The cam plates 88 constitute a part of that portion of the handling apparatus 16 associated with the truck 14, and the cooperation between the plates 88 and wheels 86 produces a tilting of the camper 12 during its movement onto and off of the truck bed 26.

Figure 2:
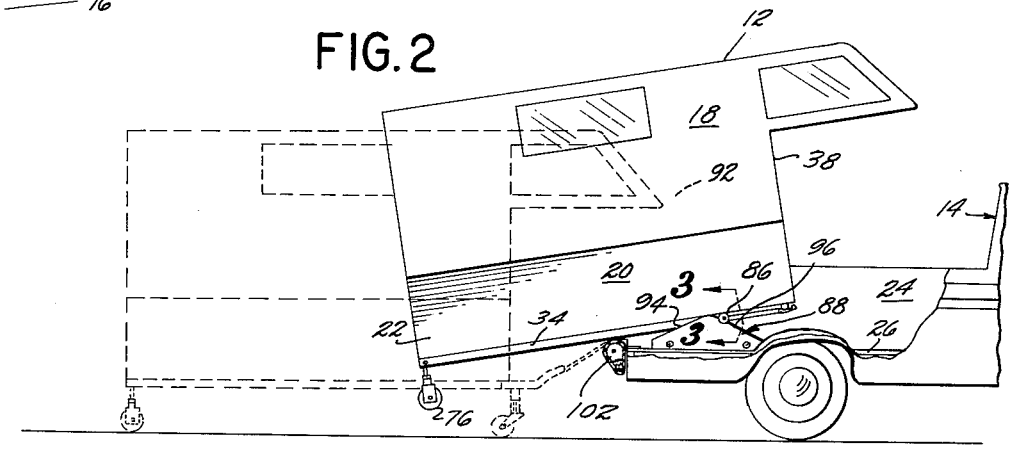
FIG. 2 is a side elevational view of the camper of FIG. 1 in an intermediate stage of the loading operation, portions of the truck being removed for clarity.
Figure 4:
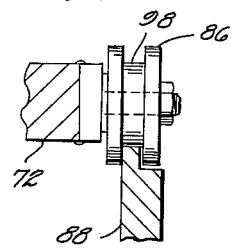
FIG. 4 is an enlarged detail view of the area designated in FIG. 3 by the numeral 4.
Figure 5:
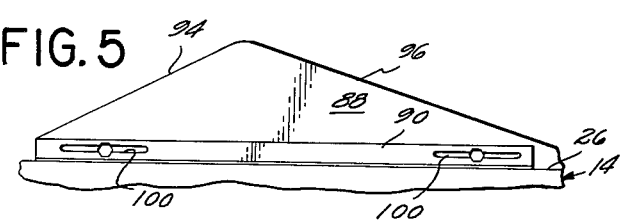
FIG. 5 is an enlarged detail view taken along the line 5—5 of FIG. 3.

More particularly, as best viewed in FIG. 2, the center of gravity of the camper 12, as generally indicated at 92, is located slightly forwardly of the middle of the camper because of the forwardly projecting portion which normally overlies the truck cab. As the camper is moved onto and off of the truck bed 26, the camper tends to suddenly and uncontrollably fall or pitch as the position of the center of gravity changes, as will be more particularly described hereinafter. To guide this tilting or pitching movement each cam plate 88 includes a pair of surfaces 94 and 96 which are upwardly inclined and converge to provide a substantially triangular cam surface for engaging the cam wheels 86 and guiding the camper in a gradual and controlled manner. As best seen in FIG. 4, the cam wheels 86 are preferably characterized by a central, circumferential groove 98 to closely receive the upper edge of the associated cam plate 88, thereby constraining the associated cam wheel 86 against undesirable transverse movement. In addition, as best illustrated in FIG. 5, each cam plate 88 includes a pair of elongated slots 100 which permit the longitudinal position of the cam plate to be adjusted by loosening the bolts securing the plate to the bracket 90. After adjustment is made to effect tipping of the camper at the proper point, the bolts are thereafter tightened to fix the plate 88 to the bracket 90.

The chains 30 and chain extensions 42 are engaged by a drive means 102 in order to move the camper in a longitudinal direction relative to the truck 14. As best viewed in FIGS. 6 and 7, the drive means 102 comprises a pair of transversely spaced-apart chain sprockets 104 which are fixedly keyed to a transverse drive shaft 106 rotatably mounted at its opposite ends by a pair of bearing mounts 108. The bearings thereof are preferably of the self-aligning type. The sprockets 104 are complementally mounted with respect to the pair of chain extensions 42 so as to be engageable therewith, as will be seen. The bearing mounts 108 are fixed in any suitable fashion to the rear end of the truck 14 to rigidly secure the mounts 108 in position relative to the truck. In the embodiment illustrated, this securement is by means of a transverse angle iron 110 bolted to the rear end of the truck bed 26, and to which a pair of vertically oriented mounting plates 112 are welded. The pair of bearing mounts 108 are bolted to the rear face of the pair of mounting plates 112, respectively.

One end of the drive shaft 106 extends beyond its associated bearing mount 108, and a driven sprocket 114 is rigidly keyed thereto. A chain 116 is trained about the driven sprocket 114 and about an idler sprocket 118 which is rotatably mounted upon a transverse stub shaft 120 secured to the lower end of the adjacent bearing mount 108. Another sprocket 122 is also mounted to the stub shaft 120, outwardly of the idler sprocket 118, and is driven by a chain 124 trained about a reducer sprocket 126 constituting the output of a conventional speed reduction unit 128.

The speed reduction unit 128 is bolted or otherwise secured to a shelf 130, partially illustrated in FIG. 7, which is suitably welded to understructure of the truck 14 beneath the truck bed 26. The speed reduction unit 128 is coupled to the output of an electric motor 132 which is also mounted on the shelf 130. The motor 132 is of the direct current type and connected by usual leads (not shown) to the battery of the truck. The circuit therefor includes a suitable switch (not shown) for actuating and reversing the motor 132 as desired. The motor is reversible so that upon operation thereof the driven sprockets 104 can be rotated in either direction, depending upon whether the camper 12 is to be loaded or unloaded.

The driven sprockets 104 can also be rotated manually by a hand crank 134, shown in dotted outline in FIG. 6, the crank 134 being mountable to the free end of the stub shaft 120.

The handling apparatus 16 is operated in the following manner to unload the camper 12 from the truck 14. First, the sprockets 104 are rotated, either by the crank 134 or by the motor 132, in a direction which urges the camper 12 rearwardly relative to the truck 14, each sprocket 104 functioning much like a pinion acting upon a rack, the rack being constituted by the associated chain 30. The camper 12 is thus moved rearwardly in a longitudinal direction relative to the truck until the rear of the camper is extended approximately two feet from the rear end of the truck. At this point the cam wheels 86 engage the inclined surfaces 96 of the cam plates 88 and begin to rearwardly tip the camper, the tipping continuing until the cam wheels 86 have reached the top of the incline surfaces 96. Beyond this point the cam wheels 86 roll down the inclined surfaces 94 of the cam plates 88 and gradually and controllably ease the camper 12 toward the ground. However, the preferred procedure is to stop rearward movement of the camper after the forward end thereof has been lifted approximately six or eight inches from the truck bed 26, and thereafter mount the two rear wheels 76 in position. At this time the two ramps 46 are also attached to the forward end of the camper. In the mounted position of the camper both rear wheels 76 and the pair of ramps 46 are normally detached from the camper 12 and stored in any suitable space on the truck.

The drive sprockets 104 are again rotated to urge the camper 12 rearwardly, the cam wheels 86 riding up the remainder of the inclined surfaces 96, and thence down the downwardly inclined surfaces 94. Thus, the camper 12 is initially tipped during its rearward movement, prior to passage of the center of gravity 92 rearwardly and beyond the fulcrum provided by the sprockets 104. Consequently, the camper 12 is prevented from suddenly and uncontrollably pitching or tipping rearwardly during unloading and is instead gradually and controllably eased toward the ground.

As the camper is moved rearwardly, the flexible chain sections 53 engage the sprockets 104 and, to insure adequate peripheral engagement thereof with the sprockets 104, the ends of the sections 53 are each passed or looped beneath one of a pair of pins 136 which, as best viewed in FIG. 6, are each slidably disposed through one of the bearing mounts 108. The inner end of each pin 136 lies behind and at approximately the same level as the axis of the adjacent sprocket 104. Each pin 136 is normally biased outwardly out of engagement with the associated chain section 53 by a compression spring 138, the pin being urged against the bias of the spring to locate it for guidance of the chain section 53 only during the unloading operation. A suitable detent arrangement (not shown) may be provided to maintain the pin 136 in the engaged position if desired.

As the camper 12 continues to move rearwardly of the truck, the ramps 46 serve to project the forward end of the camper beyond the rear bumper of the truck, and the inclined or ramp portions 50 of the ramps 46 facilitate gradual easing of the forward end of the camper toward the ground. At this point, before the forward end of the camper reaches the ground, the drive sprockets 104 are again stopped and the forward wheels 60 then mounted in position. The sprockets 104 are again rotated and the camper eased to the ground, with the loose or flexible chain sections 53 providing support during the final phase of descent to the ground. Final detachment of the chain sections 53 from the truck frees the truck 14 for other uses until it is desired to again mount the camper 12.

The loading of the camper 12 is substantially the reverse of the above procedure. The loading procedure is begun by training the loose chain sections 53 about the sprockets 104 so that the sprockets have a sufficient number of teeth in engagement with the chain sections to maintain engagement. Because of the lower positions of the ramps 46 relative to the sprockets 104, there is more than ample engagement, engagement being over at least approximately 90 degrees of each sprocket. As the loading of the camper 12 continues, the cam wheels 86 engage the inclined surfaces 94 of the cam plates 88 to prevent forward pitching or tilting of the camper 12 as the center of gravity 92 thereof passes beyond the fulcrum of the sprockets 104. The cam wheels 86 prevent violent pitching or tilting as the center of gravity 92 passes forwardly of the sprockets 104, the cam wheels 86 instead riding downwardly upon the inclined surfaces 96 to gradually ease the forward end of the camper into position upon the truck bed 26. During the loading operation, the operation is halted at appropriate times, as above indicated, to remove the ramps 46, wheels 60, and wheels 76 so that the camper can easily fit within the space above the truck bed 26.

The chains 30 and sprockets 104 are a preferred form of interengagement between the truck and trailer, but a number of alternative arrangements will immediately suggest themselves to those skilled in the art. For example, the chains 30 may be either of the link or roller type, or they may be eliminated altogether and a gear rack used with pinion gears rather than the sprockets 104. In fact, any elongated element attached to the underside of the camper 12 and including spaced indentations, openings, or receptacles would be satisfactory as long as it is adapted to drivingly accept a complemental pinion-like element rotatably carried by the truck. Likewise, the rack element on the camper might, instead of receiving openings, include a plurality of spaced projections which drivingly mesh with a pinion-like element mounted on the truck and characterized by a plurality of circumferentially spaced indentations or receptacles for receiving the projections of the camper rack. Moreover, although a pair of chains and sprockets have been described, it will be apparent that fewer or more than one pair of each may be used if desired.

From the foregoing it will be apparent that the handling apparatus 16 enables the camper to be unloaded directly upon the ground, with wheels being provided so that the camper can be supported in a mobile manner and with a low center of gravity. Jacks and the like are completely eliminated so that the camper is easily moved on its wheels without the use of a truck or the like. In addition, since the pick-up truck is maintained stationary during loading and unloading of the camper, the problem of carefully backing the truck under the camper for loading thereof is also completely eliminated.

The apparatus 16 is adapted for mounting upon both newly manufactured camper-truck combinations, as well as for installation upon existing camper-truck combinations. The cooperating cam wheels 86 and cam plate 88 are a particularly noteworthy feature because of the close control they afford of the shifting and tilting of the bulky camper during the loading and unloading operations. Such an arrangement provides sufficiently close control over the tilting movements of the camper that one man can easily operate the present apparatus 16 without danger.

Various modifications and changes may be made with regard to the foregoing detailed description without departing from the spirit of the invention or the scope of the following claims.

I claim:
1. Handling apparatus for mounting and demounting a camper relative to the bed of a pick-up truck, said apparatus comprising:
    longitudinally oriented rack means adapted for securement to the underside of said camper and including forwardly oriented and upwardly and forwardly curved rack extensions, said extensions mounting forwardly oriented flexible portions;
    and drive means adapted for mounting adjacent the rear end of said truck and including rotatable pinion means adapted for engagement with said flexible portions of said rack means to lift said camper relative to said truck on mounting of said camper, and thereafter engage successive portions of said rack means to effect longitudinal movement of said camper upon rotation of said pinion means, said rack extensions being adapted for guiding said rack means smoothly up and over said pinion means.

2. Handling apparatus for mounting and demounting a camper relative to the bed of a pick-up truck, said apparatus comprising:

a pair of transversely spaced, longitudinally oriented chains for securement to the underside of said camper;

a pair of upwardly and forwardly configured ramps adapted for detachable connection to said camper and including chain extensions and flexible chain sections for forming continuations of said chains;

a shaft for rotatable mounting adjacent the rear end of said truck;

a pair of sprockets fixed to said shaft and adapted for driving engagement with said chains, respectively, to lift and longitudinally pull said chain sections over said sprockets and thereafter drive said chain extensions and chains in a longitudinal direction to mount said camper upon said trailer;

and means for rotating said shaft.

3. Handling apparatus for mounting and dismounting a camper relative to the bed of a pick-up truck, comprising in combination a pick-up truck including a body having a bed structure, mounting wheels for said truck, a pair of spaced parallel cam plates mounted upon said truck bed, each cam plate including upwardly converging aligned surfaces, a pair of spaced drive sprockets mounted on the rear portion of said truck body and projecting rearwardly therefrom, and means carried by said camper for cooperation with said sprockets comprising longitudinally oriented rack means for meshing engagement with said sprockets, said rack means being secured to the underside of the camper and including fixed linear and upwardly extending portions terminating in flexible extremities, said flexible extremities being adapted for draping over said sprockets for meshing engagement therewith, and means for driving said sprockets when in mesh with said flexible extremities to effect longitudinal upward movement of said camper onto said truck bed, said camper including a pair of spaced guide rolls for alignment and travel over the converging cam plates during longitudinal movement of said camper to elevate and lower said camper body.

4. The structure of claim 3 wherein the upwardly extending portions of the rack means for meshing with the sprockets are mounted on a removable structure which projects outwardly from the adjacent forward wall of the camper.

5. The structure of claim 3 wherein the center of gravity of the camper is so positioned with respect to its length that it will be positioned forward of the sprockets before the rolls reach the uppermost portion of the cam plates, whereby the load of the mass will be supported and controlled by said cam plates.

6. The structure of claim 3 wherein the camper is provided with removable wheels at each bottom corner.

7. The structure of claim 3 wherein the spaced parallel cam plates mounted upon said truck bed are removable and longitudinally adjustable with respect to said truck bed.

8. In combination with a pick-up truck including a body having a bed structure, mounting wheels for said truck, and power means for driving said truck, a pair of spaced parallel cam plates mounted upon said truck bed, each cam plate including converging aligned surfaces, a pair of spaced driven sprockets mounted on the rear portion of said truck body, said sprockets having portions projecting above said truck bed, a camper body having a plurality of removable supporting wheels, longitudinally arranged rack means fixed to the bottom of said camper body and extending upwardly and beyond the rear end thereof, said rack means including flexible extremities for inter-engagement with said sprockets mounted on said truck body, means for driving said sprockets when in mesh with said flexible extremities to travel said camper body upwardly over said sprockets, and cam wheels supported on said camper body at each side thereof and in alignment with said spaced parallel cam plates for movement over said cam plates during travel of said camper body when said sprockets are being driven, whereby said camper body may be moved upward for support on said truck bed.

References Cited by the Examiner

UNITED STATES PATENTS

| 777,020 | 12/1904 | Hampton | 214—38.8 X |
|---|---|---|---|
| 946,355 | 1/1910 | Harden | 104—162 |
| 1,341,197 | 5/1920 | Reynolds | 104—162 X |
| 2,391,173 | 12/1945 | Loftus et al. | 104—50 |
| 2,458,799 | 1/1949 | Sattler | 214—517 |
| 2,685,260 | 8/1954 | Auger | 214—516 X |
| 3,159,295 | 12/1964 | Love | 214—517 |

FOREIGN PATENTS 401,533   1/1943   Italy.

GERALD M. FORLENZA, *Primary Examiner.*